United States Patent
Kraetzl

(10) Patent No.: US 6,604,426 B2
(45) Date of Patent: Aug. 12, 2003

(54) VARIABLE CAPACITANCE PRESSURE SENSOR

(75) Inventor: Jurgen Kraetzl, Flieden-Marktlos (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 0 days.

(21) Appl. No.: 09/995,020

(22) Filed: Nov. 27, 2001

(65) Prior Publication Data

US 2002/0078763 A1 Jun. 27, 2002

(30) Foreign Application Priority Data

Nov. 27, 2000 (DE) ........................ 100 58 836
Oct. 31, 2001 (DE) ........................ 101 53 266

(51) Int. Cl.$^7$ .............................. G01L 9/12
(52) U.S. Cl. ............ 73/724; 73/718; 73/763; 73/780; 361/283.4
(58) Field of Search ............ 73/724, 718, 862.381, 73/862.391, 862.392, 763, 780; 361/283.4

(56) References Cited

U.S. PATENT DOCUMENTS

| | | | | |
|---|---|---|---|---|
| 5,381,299 A | * | 1/1995 | Provenzano et al. | 361/283.4 |
| 5,792,957 A | * | 8/1998 | Luder et al. | 73/724 |
| 6,056,079 A | * | 5/2000 | Cech et al. | 180/273 |
| 6,246,936 B1 | * | 6/2001 | Murphy et al. | 701/45 |
| 6,259,167 B1 | * | 7/2001 | Norton | 307/10.1 |

\* cited by examiner

*Primary Examiner*—Hezron Williams
*Assistant Examiner*—Jermaine Jenkins

(57) ABSTRACT

A pressure sensor having a first pole element and a second pole element spaced apart from each other and forming a capacitor. The first pole element includes a substantially flat portion around which the second pole element is bent forming a bent edge portion of the second pole element. The bent edge portion is located at a distance from the substantially flat portion. The length of the distance and, thereby, the capacitance of the sensor, varies as a function of a loading state of the sensor. The sensor is well suited for use as an occupant detector in automotive seating applications.

18 Claims, 2 Drawing Sheets

VARIABLE CAPACITANCE PRESSURE SENSOR

TECHNICAL FIELD

The present invention relates to pressure sensors and in particular, concerns a capacitive pressure sensor suitable for use in automotive seats for safety applications.

BACKGROUND

Automotive occupant safety systems are increasingly employing occupant sensors as well as crash sensors to control safety restraint deployment. For example, conventional air bag deployment strategies do not consider the weight, size or position of the vehicle occupant(s). Recently, automotive safety systems have included occupant sensors to aid in determining whether air bag deployment would cause more harm than benefit and/or whether staged air bag deployment is desirable.

Conventional seat sensors comprise one or more pads including force sensitive resistive films. Variable capacitive sensors are also known. In capacitive sensors, flexible plate-like capacitor poles are spaced apart from one another by a compressible layer of synthetic material. When the capacitor sandwich is acted upon by pressure, elastic compression of the synthetic layer results in the capacitor poles approaching one another. Thus, the capacity of the capacitor varies as a function of the pressure. The existence of a force and its magnitude can then be inferred from the change in capacitance. Similarly, when the force is removed, the compressed layer of synthetic material returns the capacitor poles to their initial position.

Such known sandwich-type capacitive sensors have several drawbacks. Primarily, the thickness of the synthetic layer increases the thickness of the sensor and reduces the flexibility of the sensor as well. Thus, there is a need for a capacitive pressure sensor having improved flexibility and reduced thickness as compared to conventional capacitive pressure sensors.

SUMMARY OF THE INVENTION

The present invention overcomes the drawbacks associated with known sandwich-type capacitive pressure sensors through the provision of a twopole capacitive sensor wherein one of the poles is bent over a flat portion of the other to create a bent edge. The two poles are spaced apart from each other to form a capacitor and the degree of opening between the two poles created in the region of the bent edge varies as a function of the force applied to the sensor. The degree of opening is the bending radius or bending angle of the pole which is bent.

An advantage of the present invention is that a compressible intermediate layer of synthetic material is unnecessary. The capacitor poles are spaced apart from one another by an electrically nonconductive fluid such as air. This makes the device more flexible, lighter and thinner than conventional sandwich-type capacitive sensors.

Another advantage is that the sensor is reset by the elastically deformed bent edge. No additional sensor resetting devices are required.

A further advantage is that the sensor is less complex and therefore less expensive to manufacture than prior sensors.

Other advantages and features of the invention will become apparent upon reading the following detailed description and appended claims, and upon reference to the accompanying drawings.

BRIEF DESCRIPTION OF THE DRAWINGS

For a more complete understanding of the invention, reference should now be made to the embodiments illustrated in greater detail in the accompanying drawings and described below by way of examples of the invention.

In the drawings.

DETAILED DESCRIPTION OF THE INVENTION

Figure 1A:
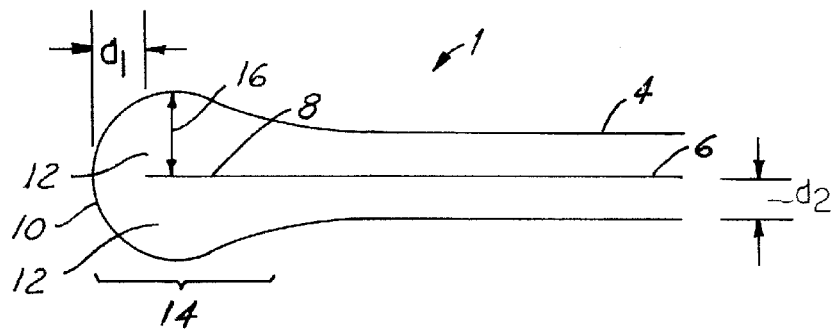
FIG. 1a is a side sectional view of a pressure sensor according to an embodiment of the present invention in an unloaded state.

The invention is described below in detail by way of examples. These are given for purposes of illustration and are not intended to limit the invention. The sensor 1 has two planar flat poles 4, 6 arranged in a spaced relationship to form a capacitor. The poles 4, 6 are each provided with an electrically nonconductive coating (not illustrated). They are thus electrically insulated from one another. The poles 4, 6 preferably are made of metal-coated sheets of synthetic material.

The first pole 6 is covered on its upper side by the second pole 4. At one lateral edge 8 of the first pole 6, the second pole 4 is bent around to form a bent edge 10, and continues around the bottom side of the first pole 6. Hence, the second pole 4 has a bent edge 10, which runs substantially parallel to the lateral edge 8 of the first pole 6.

The bent edge 10 has a bending radius that, in the unloaded state, is greater than one-half the thickness of the first pole 6. Therefore the distance 16 between the two poles 4, 6 in the region 14 near the bent edge 10 is greater than the distance ($d_2$) between the two poles 4, 6 in the remaining region of the capacitor. Thus, at least in the region 14 near the bent edge 10, the two poles 4, 6 are spaced apart from one another by an electrically nonconductive fluid such as an air gap 12.

In operation, the capacitor sensor is mounted on a surface to be monitored, such as a seating surface of a vehicle seat, and connected to an electronic evaluation system (not represented).

Figure 1B:
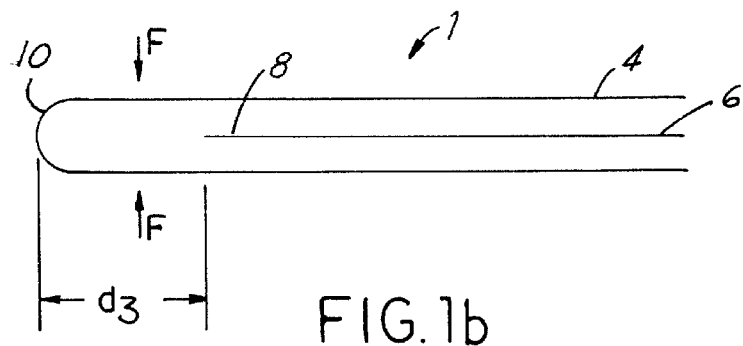
FIG. 1b is a view of the sensor of FIG. 1a in a loaded state.

FIG. 1b shows the sensor device 1 upon the effect of a load in the form of a force F perpendicular to the capacitor surfaces. The force F results in deformation of the second pole 4 in the region 14 near its bent edge 10. The bending radius of the bent edge 10 varies as a result. The pole 4 is flattened in the partial region 14 near its bent edge 10. The second pole 4 thus approaches the first pole 6 and the distance ($d_3$) in the loaded state increases as compared to the unloaded distance ($d_1$). The air gap 12 narrows or may even disappear. Owing to this, the capacitance of the sensor varies as a function of the force F. This is detected by the electronic evaluation system and used in the control of the vehicle safety system. Thus, in at least one of the two loading states of the sensor, the poles are spaced apart from one another along at least a partial region by an electrically nonconductive fluid.

Figure 2:
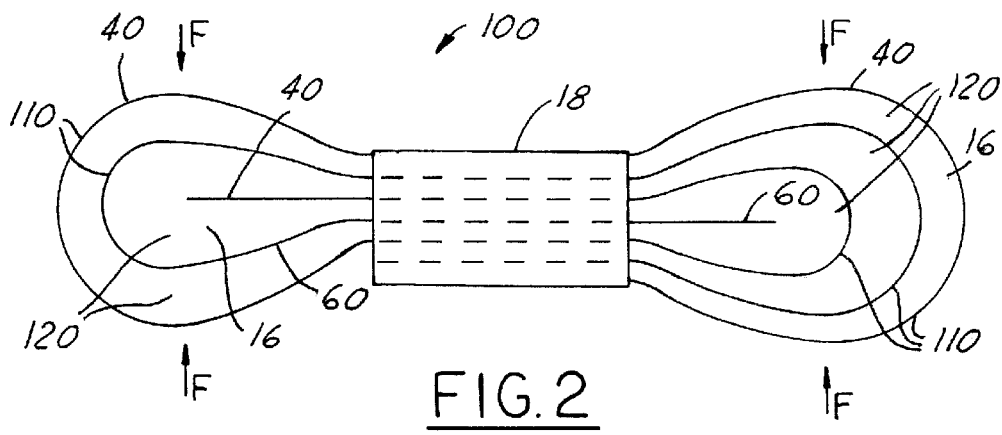
FIG. 2 is a side sectional view of a pressure sensor according to another embodiment of the present invention.

FIG. 2 shows another embodiment of a pressure sensor according to the present invention. The sensor device 100 has two planar poles 40, 60. The poles 40, 60 lie over one another and are wound into a package of sheets by repeated bending at bent edges 110. A strap 18 laid around the package of sheets holds the layers of the package together in its center.

In the present example, the bent edges 110 are designed with a great bending radius. Therefore, the package of sheets, viewed from the side, has the shape of a figure eight or hourglass. An air gap 120 is created between the poles 40, 60.

When the sensor device is loaded by a force F, the package of sheets becomes flattened, reducing the air gap 120 between the poles. The radii of curvature of the capacitor poles 40, 60 become smaller. The capacitor poles 40, 60 are brought close together in the region 16 near the bent edges 110. As the distance between the capacitor poles 40, 60 varies, the capacitance of the capacitor also varies. This variation can be detected by an electronic evaluation system as is known in the art.

The relatively large bending radii shown in the example of FIG. 2 is advantageous in readily deformable capacitor poles 40, 60. The greater elastic deformation allows a greater resetting force to be obtained. At the same time, the variation of capacitance in the sensor, and hence the sensitivity, is higher due to the greater variations in distance between the capacitor poles 40, 60 as forces act upon and release the sensor.

The alternate arrangement of the capacitor poles 40, 60 over one another in the example of FIG. 2 results in a multiplied capacity of the capacitor as compared with the embodiment illustrated in FIG. 1. The effects of force, therefore, also result in a multiplied variation of capacitance. Thus, the accuracy of the sensor device is improved.

Figure 3:
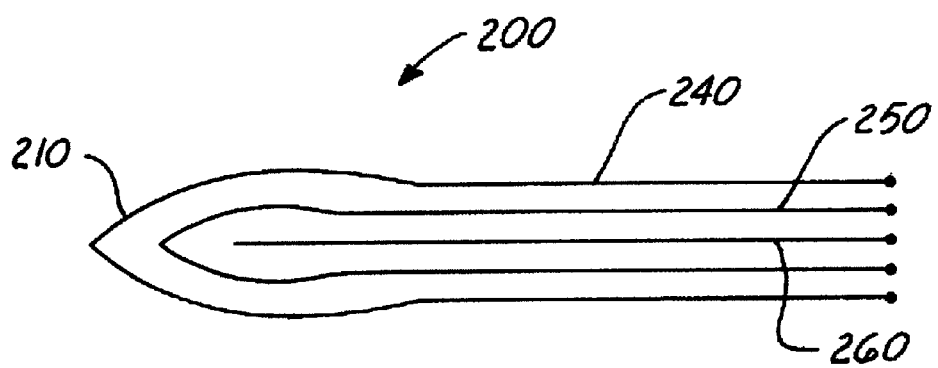
FIG. 3 is a side sectional view of a pressure sensor according to another embodiment of the present invention.

Referring now to FIG. 3 there is shown a further embodiment of a pressure sensor according to the present invention. In the sensor 200 of FIG. 3, the bent edges 210 are angular in shape rather than curved. Such an arrangement can be advantageous if stiffer materials are used for the poles 240, 260. In such a case, the variability of the sensor capacitance and the resetting force is determined as a function of the extent of angular variation at the bent edge 210. In the embodiment shown in FIG. 3, an electrically nonconductive insulating layer 250 is included between the poles 240, 260. Preferably the electrically nonconductive insulating layer is connected to one of the poles 240, 260. In one example, the electrically conductive poles 240, 260 are less than approximately 200 micrometer thick and the electrically nonconductive layer 250 is less than approximately 1 millimeter thick.

From the foregoing, it can be seen that there has been brought to the art a new and improved pressure sensor which has advantages over prior capacitance-type pressure sensors. While the invention has been described in connection with one or more embodiments, it should be understood that the invention is not limited to these embodiments. Accordingly, the invention covers all alternatives, modifications and equivalents as may be included within the spirit and scope of the appended claims.

What is claimed is:

1. A pressure sensor comprising a first pole element and a second pole element spaced apart from each other and forming a capacitor, wherein said first pole element includes a substantially flat portion around which a portion of said second pole element is bent forming a bent edge portion of said second pole element, said bent edge portion located at a first distance (16) from said substantially flat portion which is greater than a second distance ($d_2$) between said substantially flat portion and said first pole element when said pressure sensor is unloaded, a length of said first distance varying as a function of the loading state of said sensor.

2. A pressure sensor according to claim 1 wherein said length of said first distance is smaller under a loaded sensor state than under an unloaded sensor state.

3. A pressure sensor according to claim 1 wherein said bent edge portion is elastically deformed under a loaded sensor state.

4. A pressure sensor according to claim 1 wherein said first and second pole elements are spaced apart from each other along at least a partial region by an electrically non-conductive fluid in at least one of two sensor loading states.

5. A pressure sensor according to claim 1 wherein each of said first and second pole elements are planar.

6. A pressure sensor according to claim 5 wherein each of said first and second pole elements are coated with an electrically non-conductive material.

7. A pressure sensor according to claim 1 wherein said first and second pole elements are spaced apart by an electrically non-conductive insulating layer, the insulating layer being connected to one of said first and second pole elements.

8. A pressure sensor according to claim 7 wherein said first and second pole elements are less than approximately 200 micrometers in thickness and said insulating layer is less than approximately 1 millimeter in thickness.

9. A pressure sensor according to claim 1 wherein said second pole element is wound about said first pole element.

10. A pressure sensor having a varying capacitance from between a loaded and unloaded state comprising a first planar conductive element and a second planar conductive element spaced apart from each other by a distance ($d_2$) and forming a capacitor, said second planar conductive element being bent around a substantially flat portion of said first planar conductive element forming a bent edge region defining a compressible space (16) between a portion of said first and second planar conductive elements, said compressible space being greater than said distance when said sensor is unloaded and said compressible space being maximized in said unloaded state and minimized in said loaded state.

11. A pressure sensor according to claim 10 wherein said compressible space contains an electrically non-conductive fluid in said unloaded state.

12. A pressure sensor according to claim 10 wherein said first and second planar conductive elements are spaced apart by an electrically nonconductive insulating layer, the insulating layer being connected to one of said first and second planar conductive elements.

13. A pressure sensor according to claim 10 wherein each of said first and second planar conductive elements are coated with an electrically non-conductive material.

14. A pressure sensor having a varying capacitance from between a loaded and unloaded state comprising a first planar conductive element and a second planar conductive element spaced apart from each other and forming a capacitor, said first and second planar conductive element each being bent around a substantially flat portion of the other planar conductive element forming first and second bent edge regions defining first and second compressible spaces between portions of said first and second planar conductive elements said first and second compressible spaces being greater than a distance between said first and second planar conductive elements away from said bent edge regions when said sensor is unloaded, each of said compressible spaces being maximized in said unloaded state and minimized in said loaded state.

15. A pressure sensor according to claim 14 comprising a strap holding together said first and second planar conductive elements along a region between said first and second compressible spaces.

16. A pressure sensor according to claim 14 wherein said first and second planar conductive elements are spaced apart by an electrically nonconductive insulating layer, the insulating layer being connected to one of said first and second planar conductive elements.

17. A pressure sensor according to claim 16 wherein said first and second planar conductive elements are less than approximately 200 micrometers in thickness and said insulating layer is less than approximately 1 millimeter in thickness.

18. A pressure sensor according to claim 14 wherein each of said first and second planar conductive elements are coated with an electrically non-conductive material.

* * * * *